(12) United States Patent
O'Connor et al.

(10) Patent No.: US 12,104,850 B2
(45) Date of Patent: Oct. 1, 2024

(54) FLUID RECOVERY PROCESS AND APPARATUS FOR XENON AND OR KRYPTON RECOVERY

(71) Applicant: Air Products and Chemicals, Inc., Allentown, PA (US)

(72) Inventors: Declan Patrick O'Connor, Surrey (GB); Garret C. Lau, New Tripoli, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 479 days.

(21) Appl. No.: 17/313,251

(22) Filed: May 6, 2021

(65) Prior Publication Data
US 2022/0357104 A1  Nov. 10, 2022

(51) Int. Cl.
F25J 3/04 (2006.01)

(52) U.S. Cl.
CPC ....... *F25J 3/04745* (2013.01); *F25J 3/04169* (2013.01); *F25J 3/048* (2013.01); *F25J 2205/60* (2013.01); *F25J 2210/06* (2013.01); *F25J 2210/42* (2013.01); *F25J 2210/50* (2013.01); *F25J 2210/58* (2013.01);
(Continued)

(58) Field of Classification Search
CPC .. F25J 3/04169; F25J 3/04745; F25J 3/04751; F25J 3/04757; F25J 2210/04; F25J 2220/52; F25J 3/04175; F25J 2245/50; F25J 2245/02; F25J 2220/40; F25J 2215/34; F25J 2215/36
See application file for complete search history.

(56) References Cited

U.S. PATENT DOCUMENTS

| | | | |
|---|---|---|---|
| 4,568,528 | A | 2/1986 | Cheung |
| 5,309,719 | A | 5/1994 | Agrawal et al. |
| 5,471,842 | A | 12/1995 | Mostello et al. |

(Continued)

FOREIGN PATENT DOCUMENTS

| | | |
|---|---|---|
| CN | 109297258 B | 4/2020 |
| EP | 1067346 A1 | 2/2001 |

OTHER PUBLICATIONS

Arkharov, A.M. et al; Experimental Determination of the Loss of Krypton and Xenon in an Adsorption Purification Unit of a Contemporary ASU; Chemical and Petroleum Engineering, vol. 44 Nos. 3-4, 2008; pp. 131-137.

*Primary Examiner* — John F Pettitt, III
(74) *Attorney, Agent, or Firm* — Matthew R. Weaver

(57) ABSTRACT

A process for recovering at least one fluid (e.g. xenon gas and/or krypton gas, etc.) from a feed gas can include utilization of a compression system, primary heat exchanger unit, a pre-purification unit (PPU), and other units to separate and recover at least one desired fluid. In some embodiments, fluid flows output from a first heat exchanger or separation system of the plant can be split so that a portion of a stream is output for downstream processing to purify xenon (Xe) and/or krypton (Kr) product flow(s) while another portion of the stream is recycled to a compression system or the PPU to undergo further purification and heat exchange so that the product output for downstream processing has a higher concentration of Xe or Kr. Some embodiments can be configured to provide an improved recovery of Xe and/or Kr as well as an improvement in operational efficiency.

17 Claims, 3 Drawing Sheets

(52) U.S. Cl.
CPC ........ *F25J 2210/80* (2013.01); *F25J 2215/34* (2013.01); *F25J 2215/36* (2013.01)

(56) References Cited

U.S. PATENT DOCUMENTS

| | | | |
|---|---|---|---|
| 6,694,775 B1 | 2/2004 | Higginbotham et al. | |
| 6,843,973 B2* | 1/2005 | Griffiths | F25J 3/04963 423/245.3 |
| 2003/0129127 A1 | 7/2003 | Cook et al. | |
| 2006/0021380 A1* | 2/2006 | Jaouani | F25J 3/04678 62/643 |
| 2007/0283719 A1* | 12/2007 | Howard | F25J 3/04284 62/646 |
| 2009/0282866 A1* | 11/2009 | Kawai | F25J 3/04169 62/640 |
| 2010/0037656 A1 | 2/2010 | Prosser et al. | |
| 2019/0046919 A1 | 2/2019 | Liu et al. | |
| 2021/0190422 A1* | 6/2021 | Luo | B01D 5/0063 |
| 2021/0372697 A1* | 12/2021 | Xu | F25J 3/04393 |

\* cited by examiner

FLUID RECOVERY PROCESS AND APPARATUS FOR XENON AND OR KRYPTON RECOVERY

FIELD OF THE INVENTION

The present innovation relates to processes utilized to recover fluids (e.g. xenon, krypton, oxygen, argon and/or nitrogen) from air, gas separation plants configured to recover xenon and/or krypton in addition to nitrogen, argon and/or oxygen from at least one feed gas, air separation plants, air separation systems, systems utilizing multiple columns to recover xenon and/or krypton fluid in addition to nitrogen, argon, and/or oxygen fluids, and methods of making and using the same.

BACKGROUND OF THE INVENTION

Air separation processes can be configured to recover rare gases such as xenon (Xe) or krypton (Kr) as well as neon (Ne), helium (He), and/or argon (Ar). U.S. Pat. Nos. 4,568,528, 5,309,719, 6,164,089, 6,658,894, 6,735,980, 6,843,973, 6,848,269, 7,285,154, and 8,795,411 disclose examples of such systems.

Neon, argon, krypton, and xenon historically have often been recovered as secondary products in the cryogenic separation of air into oxygen and/or nitrogen products. Argon, krypton, and xenon also can be recovered from the purge gas generated in the production of ammonia from synthesis gas generated from air and natural gas. Krypton and xenon are useful in a number of specialized fields including research, medicine, instrumentation, lighting, and space applications.

Because air contains only 1.14 and 0.087 parts per million volume (ppmv) of krypton and xenon, respectively, recovery of these components by the cryogenic separation of air can be technically complex and costly. Recovery is often further complicated by the presence of light hydrocarbons (e.g. methane) in the air feed of an air separation plant. Krypton, xenon, and methane, by virtue of their boiling points relative to oxygen and nitrogen, can be concentrated in the liquid oxygen during the distillation process.

SUMMARY

We have determined that it can be desirable to minimize a flow of a xenon and/or krypton enriched purge stream when such a stream is generated in an air separation column. We have determined that minimizing the flow rate for such a stream can help facilitate further downstream purification to obtain product flows of xenon (Xe) and/or krypton (Kr) at high concentrations sufficient for economical transport to another location for further processing to form product of Xe and/or Kr fluid (e.g. a concentration of at least 20 mole percent (mol %) Xe or at least 20 mol % Kr, etc.) or at sufficiently high concentrations so that a downstream processing facility of the plant can form a product flow of Xe or Kr (e.g. at least 90 mol % Xe, at least 90 mol % Kr, at least 95 mol % Xe, at least 95 mol % Kr, at least 99 mol % Xe, at least 99 mol % Kr, etc.).

We also determined that low volatility components such as carbon dioxide ($CO_2$) and nitrous oxide ($N_2O$) can concentrate with the Xe and/or Kr and their low solubility limit may determine the minimum flow rate of the Xe and/or Kr enriched purge stream. In the event that the $CO_2/N_2O$ content determines the purge flow rate for this stream, we determined that it can be desirable to recycle a fraction of the stream so it is recycled back to a frontend pre-purification unit (PPU) or compression system to subsequently undergo compression and then be passed to the PPU along with compressed feed air so that the recycled portion is passed back through the PPU so further $CO_2/N_2O$ components can be removed via the PPU. We determined that the recycling of this portion of the Xe and/or Kr enriched purge stream can allow Kr and Xe to accumulate to a higher concentration in the purge stream that is output for downstream processing to form the Xe and/or Kr product flows. It also allows for minimization of the flow rate of the purge stream. We have determined that such an approach to Xe and/or Kr purge stream processing can allow smaller PPU and downstream processing equipment to be utilized in a plant, which can help reduce capital costs while also permitting a higher purity Xe product flow and/or Kr product flow to be obtained via the downstream processing or to have a more conventional purity of these product streams obtained at a lower processing cost. Embodiments can also help provide improved operational flexibility.

We have determined that methods and apparatuses that utilize embodiments of our improved Xe and/or Kr recovery scheme permit a smaller flow of Xe and/or Kr enriched stream to be sent to downstream processing while also having a higher Xe concentration and/or a higher Kr concentration than conventional systems without needing the use of one or more cryogenic $CO_2/N_2O$ adsorbers or substantially oversizing frontend prepurifier adsorbers. This can result in lower costs for the further downstream processing of the Xe and/or Kr purge stream without penalizing the air separation unit (ASU) cost. We have found that the recycling of a fraction of the Xe and/or Kr enriched purge stream upstream of a frontend PPU to remove additional $CO_2$ and $N_2O$ in the recycled stream can provide great process efficiency improvements while also allowing the processing to be more resilient to mal-performance of the frontend adsorbers so that higher $CO_2/N_2O$ slippage into the coldbox can be better tolerated. For example, if such a situation is detected as occurring due to adsorbent material or catalyst material becoming deactivated etc., the process can be modified to account for such an occurrence by increasing the fraction of the Xe and/or Kr enriched purge stream recycled upstream for further purification via the PPU.

As another example, in some situations a PPU may be designed so that the purge stream required to keep the $CO_2$ and $N_2O$ in the purge stream below a threshold value results in a relatively high purge flow with a very low Xe concentration and/or a very low Kr concentration. We have determined that in such situations, recycling of a fraction of the Xe and/or Kr enriched purge stream upstream of a frontend PPU to remove additional $CO_2$ and $N_2O$ in the recycled stream can also provide great process efficiency improvements while also allowing the processing to be more resilient to mal-performance of the frontend adsorbers so that higher $CO_2/N_2O$ slippage into the coldbox can be better tolerated.

We have determined that the recycling of a fraction of the Xe and/or Kr enriched purge stream upstream of a frontend PPU can help facilitate the retrofit of Xe recovery and/or Kr recovery to an existing ASU which has a Xe enriched and/or Kr enriched purge having a rather low Xe concentration and/or Kr concentration to improve the recovery of Xe and/or Kr as well as improve the operational efficiency of the ASU being retrofitted. For instance, the retrofit of the ASU to utilize an embodiment of our Xe and/or Kr recovery process can permit Xe concentrations and/or Kr concentration within a Xe enriched and/or Kr enriched purge stream to be sufficiently high enough to allow for Xe and/or Kr recovery to be performed via downstream processing instead of losing the Xe and/or Kr components.

In other retrofit situations where an ASU may have a pre-existing downstream processing capability to form a product flow of Xe and/or Kr, the retrofit operation can permit such downstream processing to be done using smaller processing equipment sized to permit a lower flow of the Xe and/or Kr rich purge stream to be routed for downstream processing. Such size reductions can provide operational cost reduction by reduced sized and process requirements for such flows as well as lower capital costs.

A further disadvantage of over-sizing the front-end adsorber that can be solved by embodiments that utilize an embodiment of our Xe and/or Kr recovery scheme is the increasing of Xe losses by co-adsorption of Xe on 13X or other X-zeolite type adsorbents common in air pre-purifiers, e.g. NaMSX, NaLSX, CaX. In some situations, Xe losses from such co-adsorption can approach 8% when the front-end adsorber of a PPU is sized to remove both $CO_2$ and $N_2O$. Such losses of Xe can be minimized or fully avoided by embodiments of our Xe and/or Kr recovery scheme as smaller PPUs can be utilized and one or more adsorber beds of the PPU can utilize different catalysts or zeolites as well to minimize, if not eliminate, Xe co-adsorption. This can also help increase the Xe concentration within the Xe and/or Kr enriched purge stream.

Embodiments incorporating this approach can include the use of small pore zeolites, such as 4A zeolites (also referred to as NaA zeolite), in the front-end adsorber for $CO_2$ and $N_2O$ removal. The pore size of 4A zeolite can be large enough to allow $CO_2$ and $N_2O$ to adsorb therein, but small enough to exclude the majority of Xe in the fluid being purified, which can allow for higher Xe recovery through the front-end adsorber(s) of the PPU and concentration of it in downstream cryogenic processes. The 4A zeolite can be used as a full or partial replacement of 13X zeolite. In some embodiments, it may be most advantageous to size the 4A zeolite for $CO_2$ removal, and some $N_2O$ removal, while keeping some 13X zeolite for trace hydrocarbon removal and the rest of the $N_2O$ removal. In yet other embodiments, a full replacement of 13X zeolite with 4A zeolite could be used to reduce Xe losses by up to a factor of 10. Other small pore zeolites may be used in addition to or as a substitute for 4A zeolite. These other small pore zeolites can include, for example, chabazite, rho, gismondine, or merlinoite as well as cation combinations within these zeolites. The A zeolite could include one or more of: sodium (Na), potassium (K), calcium (Ca), and zinc (Zn) in some of these embodiments.

In a first aspect, embodiments of a process for separation of a feed gas comprising oxygen, nitrogen, and argon (e.g. air) can include purifying a compressed feed gas via a pre-purification unit (PPU) before feeding the purified and compressed feed gas to a first separation system to form at least one product flow from the feed gas. The at least one product flow can include a nitrogen flow, an oxygen flow, and/or an argon flow. The process can also include outputting a first purge stream comprising xenon (Xe) and/or krypton (Kr) from the first separation system and splitting the first purge stream so that a first portion of the first purge stream is directed to at least one downstream processing unit (DPU) to form a first product flow comprising Xe and/or a second product flow comprising Kr and a second portion of the first purge stream is directed upstream of the PPU for undergoing additional purification via the PPU.

In a second aspect, embodiments of the process can also include adjusting the splitting of the first purge stream so that a flow rate of the first portion of the first purge stream directed to the at least one DPU is decreased and the flow rate of the second portion of the first purge stream directed to the PPU is increased so that a fraction of the first purge stream that is recycled to the PPU is increased in response to a concentration of carbon dioxide ($CO_2$) and/or nitrous oxide ($N_2O$) meeting or exceeding a first pre-selected threshold value.

In a third aspect, the process can also include adjusting the splitting of the first purge stream so that a fraction of the first purge stream directed to the PPU is increased so that the fraction of the first purge stream that is recycled to the PPU is increased in response to a concentration of carbon dioxide ($CO_2$) and/or nitrous oxide ($N_2O$) in the purified and compressed feed gas meeting or exceeding a first pre-selected threshold value. Embodiments utilizing the third aspect can be used in combination with the first aspect and/or the second aspect.

In embodiments of the process, the PPU can include adsorbent material. The adsorbent material can include material that adsorbs one or more undesired impurities form the feed. In some embodiments, the adsorbent material can include zeolites having a pore size that is sized to receive and adsorb $CO_2$ and $N_2O$ herein while excluding a majority of the Xe in the compressed feed gas undergoing purification within the PPU. For example, the adsorbent material can include 4A zeolite, chabazite, rho, gismondine, and/or merlinoite.

In a fourth aspect, the process can be configured so that the splitting of the first purge stream so that the first portion of the first purge stream is directed to at least one DPU to form a first product flow comprising Xe and/or a second product flow comprising Kr and the second portion of the first purge stream is directed upstream of the PPU for undergoing additional purification via the PPU is performed via a valve or a splitting device. In some embodiments, the valve or the splitting device can be positioned external to a coldbox.

In a fifth aspect, the process can be configured so that the splitting of the first purge stream so that the first portion of the first purge stream is directed to at least one DPU to form a first product flow comprising Xe and/or a second product flow comprising Kr and the second portion of the first purge stream is directed upstream of the PPU for undergoing additional purification via the PPU is performed via a first heat exchanger that is downstream of the PPU and upstream of the first separation system. In some embodiments, the first heat exchanger can be a heat exchanger of a coldbox or be configured as the coldbox.

In a sixth aspect, the process can be configured so that the splitting of the first purge stream so that the first portion of the first purge stream is directed to at least one DPU to form a first product flow comprising Xe and/or a second product flow comprising Kr and the second portion of the first purge stream is directed upstream of the PPU for undergoing additional purification via the PPU is performed external to a coldbox or in the coldbox.

In some embodiments of the process, there may be a plant that includes multiple different ASUs that utilize different embodiments of the process or there can be multiple ASUs that combined utilize an embodiment of the process. In yet other embodiments of the process, a plant can include a single ASU that utilizes and embodiment of the process.

In a seventh aspect, an apparatus for recovery of xenon (Xe) and/or krypton (Kr) is also provided. Embodiments of the apparatus can be configured to utilize one or more of the processes of the first through sixth aspects discussed above or other embodiments discussed herein.

In an eighth aspect, an embodiment of the apparatus can include a splitting device positioned to split a first purge stream comprising xenon (Xe) and/or krypton (Kr) output from a first separation system so that a first portion of the first purge stream is directed to at least one DPU to form a first product flow comprising Xe and/or a second product flow comprising Kr and a second portion of the first purge stream is directed upstream of a PPU positioned to purify compressed feed gas for feeding to the first separation system.

The apparatus can be configured for being retrofit into a plant or ASU or can be configured to be included within a new plant or ASU.

In a ninth aspect, the apparatus can include the PPU. The PPU can be positioned to receive the compressed feed gas to purify the compressed feed gas for sending the compressed feed gas to the first separation system to form at least one product flow from the feed gas. The at least one product flow can include a nitrogen flow, an oxygen flow, and/or an argon flow. Embodiments of the apparatus that include a PPU can be configured so that the PPU includes adsorbent material comprising zeolites having a pore size that is sized to receive and adsorb carbon dioxide ($CO_2$) and/or nitrous oxide ($N_2O$) herein while excluding a majority of Xe in the compressed feed gas. The adsorbent material can include, for example, 4A zeolite, chabazite, rho, gismondine, and/or merlinoite.

In a tenth aspect, the apparatus can include a first separation system. The first separation system can be configured to output the first purge stream comprising the Xe and/or the Kr and also form the at least one product flow including the nitrogen flow, the oxygen flow, and/or the argon flow. In some embodiments, the first separation system can include multiple columns. IN some embodiments of the apparatus, the seventh aspect can include the eighth, ninth, and/or tenth aspects.

In an eleventh aspect, the splitting device can include a valve or the splitting device can be positioned within a first heat exchanger that is downstream of the PPU and upstream of the first separation system. In some embodiments, the first heat exchanger is a first heat exchanger of a coldbox or is configured as the coldbox.

In a twelfth aspect, the apparatus can be designed so that the splitting device is configured so that splitting of the first purge stream so that a fraction of the first purge stream that is directed to the at least one DPU is decreased and a fraction of the first purge stream that is recycled to the PPU is increased in response to a concentration of carbon dioxide ($CO_2$) and/or nitrous oxide ($N_2O$) meeting or exceeding a first pre-selected threshold value.

In a thirteenth aspect, the apparatus can be designed so that the splitting device is configured so that the first purge stream is splittable so that a flow rate of the second portion of the first purge stream directed to the PPU is increased to a first increased flow rate so that a fraction of the first purge stream that is recycled to the PPU is increased in response to a concentration of carbon dioxide ($CO_2$) and/or nitrous oxide ($N_2O$) in the purified and compressed feed gas meeting or exceeding a first pre-selected threshold value.

In some embodiments, the apparatus can be configured to utilize the twelfth and the thirteenth aspects in combination with the seventh aspect, the eight aspect, the ninth aspect, the tenth aspect and/or the eleventh aspect. Such embodiments can utilize an aspect of the process including one or more of the first aspect, the second aspect, the third aspect, the fourth aspect, the fifth aspect, and the sixth aspect.

Other elements can also be included in embodiments of the system or apparatus. For instance, one or more pumps, vessels, or other units can also be utilized in embodiments of the system or apparatus. It should be appreciated that embodiments of the system or apparatus can be structured and configured to utilize at least one embodiment of the enhanced Xe and/or Kr recovery process.

Other details, objects, and advantages of our processes utilized to recover fluids (e.g. xenon and/or krypton in addition to oxygen, argon and/or nitrogen) from air, gas separation plants configured to recover xenon and/or krypton in addition to nitrogen, argon and/or oxygen from at least one feed gas, air separation plants, air separation systems, systems utilizing multiple columns to recover xenon and/or krypton in addition to nitrogen, and/or argon, and/or oxygen fluids, plants utilizing such systems or processes, and methods of making and using the same will become apparent as the following description of certain exemplary embodiments thereof proceeds.

BRIEF DESCRIPTION OF THE DRAWINGS

Exemplary embodiments of processes utilized to recover fluids (e.g. xenon and/or krypton in addition to oxygen, argon and/or nitrogen) from air, gas separation plants configured to recover xenon and/or krypton in addition to nitrogen, argon and/or oxygen from at least one feed gas, air separation plants, air separation systems, systems utilizing multiple columns to recover xenon and/or krypton in addition to nitrogen, and/or argon, and oxygen fluids, plants utilizing such systems, and methods of making and using the same are shown in the drawings included herewith. It should be understood that like reference characters used in the drawings may identify like components.

DETAILED DESCRIPTION

Figure 1:
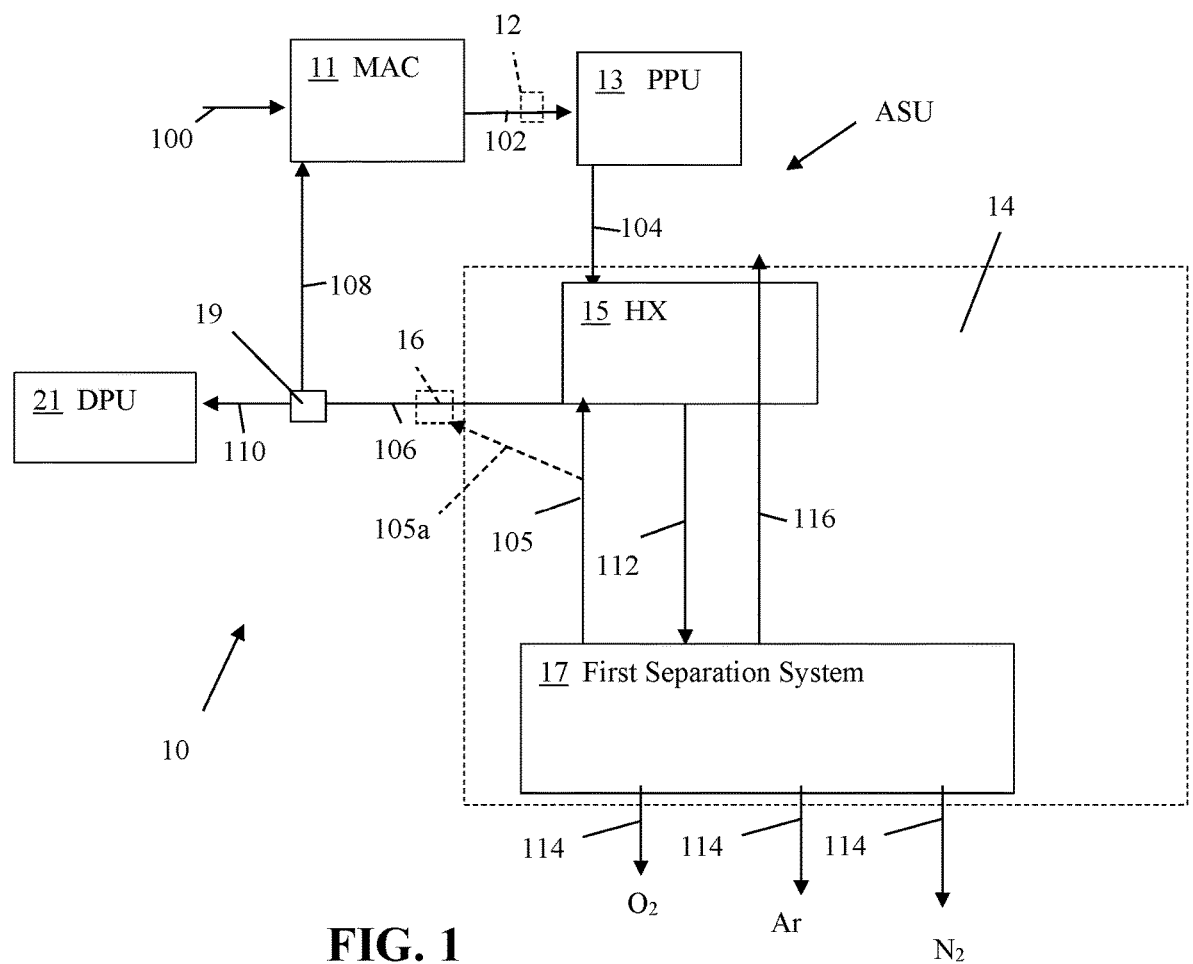
FIG. 1 is a schematic block diagram of a first exemplary embodiment of a plant utilizing a first exemplary embodiment of the air separation process. An optional vaporizer 16 is shown in broken line in FIG. 1. The optional vaporizer 16 can be configured to vaporize the purge stream 106 in the event the purge stream is output from the cold box 14 as a liquid or mix of liquid and vapor.
Figure 2:
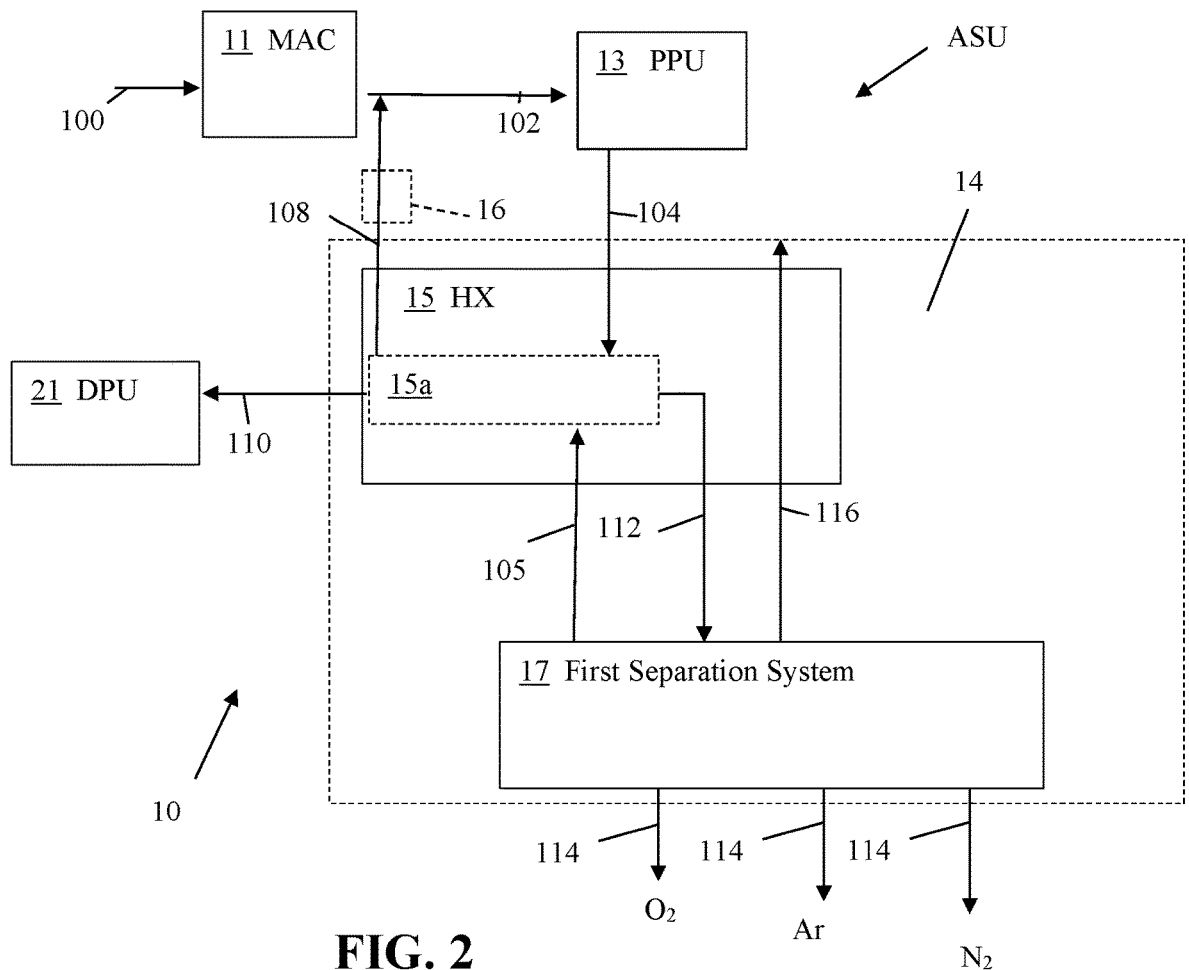
FIG. 2 is a schematic block diagram of a second exemplary embodiment of a plant utilizing a second exemplary embodiment of the air separation process.
Figure 3:
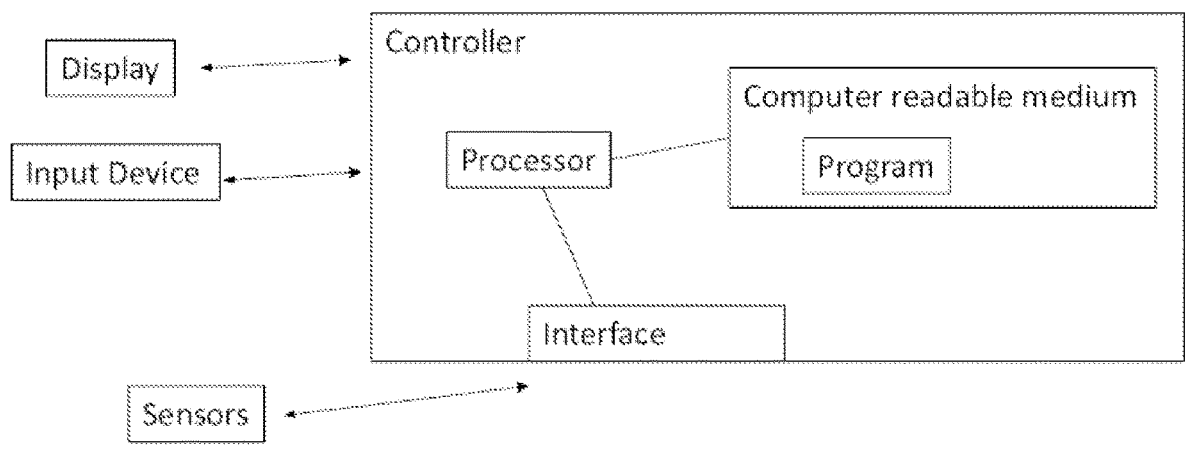
FIG. 3 is a block diagram of an exemplary controller that can be utilized in the first exemplary embodiment of a plant or the second exemplary embodiment of a plant.

Referring to FIGS. 1-3, a plant 10 can be configured to utilize an air separation process that can be configured to facilitate recovery of at least one xenon and/or krypton fluid flow 110 in addition to argon, nitrogen, and/or oxygen fluid product flows 114. Embodiments of the plant 10 can utilize a controller, to help monitor and/or control operations of the plant 10. In some embodiments, the plant 10 can be configured as an air separation system or a cryogenic air separation system. The plant 10 can be a standalone facility or be a facility that is incorporated in a larger facility having other plants (e.g. a manufacturing plant for making goods, a mineral refining facility, an electricity generation plant, etc.). The plant 10 can have a single air separation unit (ASU) that can employ an embodiment of the air separation process or can utilize multiple different ASUs. One or more of the ASUs in an embodiment of the plant having multiple ASUs can utilize an embodiment of the air separation process.

Referring to FIGS. 1-3, embodiments of the plant 10 can include a gas feed 100. The feed 100 can be air obtained from the atmosphere external to the plant 1 or a process gas from a facility connected to the plant 1. The feed 100 can be compressed in a main compression system 11, which can also be referred to as a "MAC" in some embodiments. A first flow of compressed feed fluid can be output from the compression system 11 and sent to a pre-purification unit (PPU) 13 via a PPU feed conduit for purification of the pressurized feed 100 to remove certain components of the feed after it is compressed. The compressed air output from the compression system 11 can undergo cooling via at least one cooler 12 (shown in broken line in FIG. 1) before the air is fed to the PPU 13. In other embodiments, no such cooler may be utilized.

The PPU 13 can be configured to include one or more adsorbers that are configured to remove trace components from the feed that may have a relatively high boiling point or be an impurity that may otherwise represent an undesirable impurity that may present an operational issue such as, for example, carbon dioxide ($CO_2$), carbon monoxide (CO), nitrous oxide ($N_2O$), hydrogen ($H_2$), heavier hydrocarbons (e.g. ethylene, acetylene, and/or butane, etc.) and/or water ($H_2O$).

In some embodiments, the compression system 11 can output the compressed feed as a pressurized gas stream 102 (e.g. a pressurized air feed) to the PPU 13 and the PPU 13 can output this pressurized gas stream after it has had various components removed from it as a purified and pressurized gas steam 104. The purified and pressurized gas stream 104 can include, for example, 76-79% by volume nitrogen ($N_2$), 20-22% by volume oxygen ($O_2$), and 0.8%-3% by volume argon (Ar) or 76.59-78.12% by volume $N_2$, 20.5-20.95% by volume $O_2$, and 2.87-0.93% by volume Ar. Additionally, the purified and pressurized gas stream 104 can also include 0.080-0.094 ppmv xenon (Xe) and 1 to 1.2 ppmv krypton (Kr).

The purified and pressurized gas stream 104 can be output from the PPU 13 and subsequently fed to a first heat exchanger (HX) 15 of a cold box 14 via at least one PPU HX feed conduit. In some embodiments, the first HX 15 can be considered a main heat exchanger of a coldbox 14, or a primary heat exchanger of a coldbox 14 (shown schematically in broken line in FIGS. 1 and 2).

The purified and pressurized gas stream 104 can be fed directly from the PPU 13 to the first HX 15 via at least one conduit or can be split into multiple flows for feeding to the first HX 15. For instance, in some embodiments the purified and pressurized gas stream 104 can include a first portion flow that is fed to the first HX 15 via at least one conduit and a second portion flow that is fed to the first HX 15. A conduit arrangement can include a valve or other type of flow splitting mechanism to split the purified and pressurized gas stream 104 into the multiple flows. In some embodiments, some of the split flows can be further compressed before being fed to the first HX 15 while one or more other flows are sent directly from the PPU 13 to the first HX. Such embodiments can also utilize one or more other second heat exchangers for cooling the split flows of fluid instead of feeding the flow to the first HX 15 or before feeding the split flow(s) to the first HX 15.

In such embodiments, the pressure of the first portion flow of the purified and pressurized gas stream 104 can be a pressure of between 5 atmosphere (atm) and 30 atm or between 5 bar and 30 bar. The pressure of the second portion flow of the purified and pressurized gas stream 104 after it is further pressurized to form a further pressurized second portion flow can be at a pressure of between 5 atm and 100 atm. For instance, in some embodiments, the pressure of the first portion flow of the purified and pressurized gas stream 104 can be between 5-15 atm, 5-25 atm, or 10-30 atm, and the pressure of the further pressurized second flow of the purified and pressurized gas stream 104 can be greater than 5 atm and less than 100 atm, greater than 10 atm and less than 75 atm, or greater than 10 bar and less than 70 bar. In yet other embodiments, there may be only a single purified and pressurized gas stream 104 that is at a pressure range within any of the above noted pressure ranged (e.g. between 5 atm and 100 atm, 5-15 atm, 5-25 atm, 5-30 atm, or 10-30 atm, etc.).

The purified and pressurized gas stream 104 can be cooled in the first HX 15 of the coldbox 14 to form a first cooled first heat exchanger output stream 112 that is fed to a first separation system 17 of the cold box 14. The first separation system 17 of the cold box 14 can include a high pressure (HP) column 107 of a multiple column assembly (e.g. a column or tower having multiple columns operating at different pressures via at least one high pressure column feed conduit as well as a low pressure (LP) column. The HP column can be considered a first column of the multiple column assembly that operates at a highest pressure of the columns of the multiple column assembly. For instance, the HP column can operate at a pressure that is higher than the operational pressure of a second column of the multiple column assembly (e.g. the LP column).

The LP column can be considered a second column of the multiple column assembly that operates at a pressure that is below the operating pressure of a first column (e.g. the HP column). In some embodiments, the LP column of the first separation system 17 can operate at a pressure of between 1.1 atm and 8 atm, between 1.1 atm and 3 atm or at a pressure that is greater than 1 bar and less than 8 bar, and the HP column 107 can operate at a pressure of between 4 atm and 20 atm, between 4.5 and 12 atm or at a pressure that is greater than 4 bar and less than 12 bar.

The HP column and LP column of the first separation system 17 can be positioned and configured to process the cooled purified and pressurized gas stream 104 output from the first HX 15 (and air cooled from other parallel second heat exchangers, if utilized as discussed herein) as the first cooled first heat exchanger output stream 112 via at least one first separation system feed conduit. The one or more streams output from the first HX 15 sent to the first separation system 17 can be processed by the first separation system 17 to form oxygen ($O_2$), and/or nitrogen ($N_2$) and/or Argon (Ar) fluids as product fluids and/or for use as process fluids in other elements of the plant 10. In some embodiments, additional product flows can also be generated, which can include at least one waste product flow 116 that can be passed to the first HX 15 as a cooling medium for absorbing heat from the purified and pressurized gas stream 104 fed to the first HX. The waste product flow 116 can include at least one nitrogen or oxygen enriched waste flow that may be used as a cooling medium and/or an adsorber regeneration fluid prior to being output as at least one emission of the plant 10 or prior to being used in another plant process (e.g. as a process gas in another plant process).

For instance, a plant 10 configured to produce oxygen as a primary product can have at least one nitrogen enriched waste flow used as a cooling medium or a regeneration fluid for regeneration of adsorbent material or catalyst material utilized in at least one off-line adsorber of the PPU 13. As another example, a plant 10 configured to produce nitrogen as the primary produce can have at least one oxygen enriched waste flow used as a cooling medium or a regeneration fluid for regeneration of adsorbent material or catalyst material utilized in at least one off-line adsorber of the PPU 13.

The nitrogen-rich product stream 114 can include 100-99 volume percent (vol. %) nitrogen can be output from the first separation system 17 as a first product flow 114. Oxygen-rich liquid and/or vapor streams can be output as product flows 114 so that the oxygen concentration in each and every one of these streams is at least 90 mole percent (mol %) oxygen or is greater than or equal to 99.5 mol % oxygen. The argon-rich product flow 114 can include 0-4 vol. % oxygen, 0-0.5 vol. % nitrogen, and the balance argon (e.g. 100-95.5 vol. % argon) in some embodiments. The product flows 114 can be output as liquid products or can be routed to at least one heat exchanger to form gaseous product flows (e.g. sent to first heat exchanger 15 or another heat exchanger of the plant 10 to undergo vaporization).

In addition to the formation of product flows 114, the first separation system 17 of the cold box 14 can also form a Xe and/or Kr enriched purge stream 105 for feeding from the first separation system 17 to the first HX 15 via a purge stream conduit or form a Xe and/or Kr enriched purge stream 105a for feeding to a vaporizer 16 external to the cold box 14 for vaporization of the stream via a purge stream conduit (shown in broken line in FIG. 1). The Xe and/or Kr enriched purge stream 105 or 105a can include 200-1,000 ppmv Kr and 15-200 ppmv Xe, or can include up to 1,000 ppmv Kr and at least 30 ppmv Xe, or can only include 15-100 ppmv Xe (with no Kr, minimal amounts of Kr or an insignificant amount of Kr for the process of the plant 10). In yet other embodiments, the Xe and/or Kr enriched purge stream 105 or 105a can include 30-80 ppmv Xe with no Kr, minimal amounts of Kr, or an amount of Kr of up to at least 1000 ppmv.

The purge stream 105 or 105a can have a minimum allowed flow rate in some embodiments. For example, in embodiments of the plant 10 in which a solubility limit(s) of the $CO_2$ and/or $N_2O$ in the purge stream could be used to establish a threshold minimum flow rate for the purge stream 105 or 105a. In embodiments designed so that the solubility limits of the $CO_2$ and/or $N_2O$ in the purge stream are not control parameters for the purge stream flow rate, then the minimum purge flow rate can be determined based on a pre-selected allowable hydrocarbon content within the purge stream 105 or 105a. In some embodiments, the plant 10 can be operated so that the purge stream 105 or 105a has its minimum permissible flow rate based on such control criteria.

In some embodiments, the Xe and/or Kr enriched purge stream 105 can be output as a final liquid purge stream of the first separation system 17 and/or cold box 14. For oxygen producing air separation systems, the Xe and/or Kr enriched purge stream 105 can be a liquid oxygen purge stream output from the sump of the LP column. The Xe and/or Kr enriched purge stream 105 can be formed as an output of the LP column or be output after the liquid oxygen purge stream undergoes a vaporization to further concentrate the Xe and Kr in the Xe and/or Kr enriched purge stream 105.

For an embodiment of the plant 10 configured as an air separation unit that produces nitrogen product without significant oxygen product, a crude liquid oxygen purge stream output from a low pressure boiler can be the source of the Xe and/or Kr enriched purge stream 105. For such embodiments, the Xe and/or Kr enriched purge stream 105 can be formed from a purge reboiler and/or stripping column that can process the crude liquid oxygen purge stream to form the Xe and/or Kr enriched purge stream 105.

The Xe and/or Kr enriched purge stream 105 output from the first separation system 17 of the coldbox 14 can be fed to the first HX 15 to be warmed therein while also functioning as a cooling medium for the pressurized and purified gas stream 104 fed therein. The warmed Xe and/or Kr enriched purge stream 106 can be output from the first HX 15 of the coldbox or vaporizer 16 to be directed to a downstream processing unit (DPU) 21. The DPU 21 can include, for example, multiple distillation columns or can be configured to utilize one or more adsorbers alone or in combination with one or more distillation columns. Other embodiments may utilize strippers, towers, or other processing elements. In some embodiments, these elements can be arranged for use in combination with one or more adsorbers and/or one or more distillation columns.

The DPU 21 can be configured to form Xe-rich and/or Kr-rich product flows (e.g. an Xe product flow having a mole percentage of Xe of at least 10%, at least 20%, at least 30%, at least 50%, over 80%, over 90% or over 99%, and/or a Kr product flow having a mole percentage of Kr of at least 10%, at least 20%, at least 30%, at least 50%, over 80%, over 90% or over 99%). The pre-selected purity of the Xe and/or Kr product flow(s) exiting the DPU 21 can depend on whether the exist concentration of the flow is to be a product gas or is to be shipped elsewhere for further processing.

In some embodiments, the DPU 21 can be configured so that the feed stream is pre-pressurized before being fed to the DPU to at least 4 atm. Such pressurization can be provided by at least one compressor positioned as a component of the DPU 21 or as a pre-compression system to the DPU 21. The pressure can alternatively be increased, when needed, via a static head increase or pump. Such pressure increase can be configured to occur external to the cold box 14 or can be provided before the purge stream 105 or 105a is fed to the first HX 15 or vaporizer 16.

Prior to being passed to the DPU 21, the warmed Xe and/or Kr enriched purge stream 106 can be split via a warmed Xe and/or Kr enriched purge stream splitting device 19, which may include a valve or other flow control element. A first portion of the warmed Xe and/or Kr enriched purge stream 110 can be directed to the DPU 21 via the warmed Xe and/or Kr enriched purge stream splitting device 19 while a second portion of the warmed Xe and/or Kr enriched purge stream 108 can be recycled back to the compression system 101 or to a location that is downstream of the compression system 101 and upstream of the PPU 13 so that the recycled second portion is again passed through the PPU 13 to undergo further purification for further removal of any $CO_2$ or $N_2O$ that may be included therein. The splitting device 19 can be positioned within the coldbox 14 or be external to the coldbox 14.

In some embodiments, the splitting device 19 can be incorporated into the first heat exchanger 15 as a heat exchanger flow splitting device 15a, an example of which is shown in FIG. 2. For such an embodiment, the heat exchanger flow splitting device 15a can split the Xe and/or Kr enriched purge stream 105 while it is undergoing warming within the first HX 15 so that the first portion of the warmed Xe and/or Kr enriched purge stream 110 can be directed to the DPU 21 while the second portion of the warmed Xe and/or Kr enriched purge stream 108 can be recycled back to the compression system 101 or to a location that is downstream of the compression system 101 and upstream of the PPU 13 so that the recycled second portion 108 is again passed through the PPU 13 to undergo further purification for further removal of any $CO_2$ or $N_2O$ that may be included therein. Such embodiments can utilize a vaporizer 16 (shown in broken line in FIG. 2) to provide additional heating to the recycled stream to be recycled back to the PPU 13.

The splitting of the Xe and/or Kr enriched purge stream 105 or 105a into first and second portion flows 110 and 108 can be dynamically adjusted to account for process parameters as well. For example, as the adsorbent material within the PPU 13 loses effective life, more $CO_2$ and/or $N_2O$ may breakthrough downstream of the PPU 13. In response to detecting an increase in $CO_2$ and/or $N_2O$ concertation exceeding a first pre-selected operational value, the splitting of the Xe and/or Kr enriched purge stream 105 into first and second portion flows 110 and 108 can be adjusted so that more of the Xe and/or Kr enriched purge stream 105 is recycled as the $CO_2$ and/or $N_2O$ concentration increases beyond the first pre-selected value. Such increase in the recycled amount of the Xe and/or Kr enriched purge stream 105 can be dynamically adjusted based on the particular concentration of $CO_2$ and/or $N_2O$ detected or can be adjusted in step-wise fashion to different increasing levels that correspond to the detection of the detected concentration of $CO_2$ and/or $N_2O$ meeting or exceeding different pre-selected thresholds. For example, the recycled second portion 108 can be adjusted to a second flow rate that is greater than a first flow rate in response to the $CO_2$ and/or $N_2O$ meeting or exceeding the first pre-selected value (e.g. increased from an initial flow rate to a first increased flow rate), and then may be further adjusted to a third flow rate that is greater than the second flow rate in response to the $CO_2$ and/or $N_2O$ concentration subsequently meeting or exceeding a second pre-selected threshold value that is higher than the first pre-selected threshold value (e.g. increased from the first increased flow rate to a second increased flow rate), and may be yet further adjusted to a fourth flow rate that is greater than the third flow rate upon the $CO_2$ and/or $N_2O$ concentration meeting or exceeding a third pre-selected threshold value that is greater than the second pre-selected threshold value (e.g. increased from the second increased flow rate to a third increased flow rate), etc. Such changes to the recycled second portion 108 can result in the first portion 110 of the warmed Xe and/or Kr enriched purge stream directed to the DPU 21 being decreased as the flow rate of the second portion 108 is increased to increase the fraction of purge stream 105 or 105a being recycled back to the PPU 13 and/or flow rate of the purge stream portion being recycled to the PPU 13. The increased fraction of the purge stream being recycled to the PPU 13 can help avoid degradation of the Xe and/or Kr concentration within this flow of the warmed Xe and/or Kr enriched purge stream fed to the DPU 21 so that the operational performance of the DPU 21 is not substantially degraded or rendered uneconomical due to the increased breakthrough of $CO_2$ and/or $N_2O$ that may occur during operations of the plant. This can provide significant improvement in operational performance of the plant and provide increased design and operational flexibility for the plant.

As discussed above, the PPU 13 can be configured to remove $CO_2$, $N_2O$, CO, $H_2$, as well as heavier hydrocarbons (e.g. butane, ethylene, and/or acetylene, etc.) from the pressurized gas stream 102. $CO_2$ and $N_2O$ have very low volatility and could still have trace breakthrough past the PPU during operations. This can particularly occur when the adsorbent material of the PPU begins to near the end of its life and may be near the time when the on-line adsorbers of the PPU may be scheduled to undergo a regeneration operation. If the $CO_2$ and/or $N_2O$ are able to break through the PPU and stay within the purified and pressurized gas steam 104 output from the PPU, they can accumulate in the Xe and/or Kr enriched purge stream 105 due to their low volatility. The presence of these undesired components, $CO_2$ and/or $N_2O$, can freeze out due to the operational temperatures of the plant 10 and their freezing points, which can create significant operational problems as impediments to flow and possible damage to process elements that can result from their freezing. Even trace breakthrough of $CO_2$ and/or $N_2O$ in the purified and pressurized gas steam 104 can limit the extent to which the Xe and/or Kr enriched purge stream 105 could be reduced to improve the Xe and/or Kr concentrations in the stream, which can limit the Xe concentration and/or Kr concentration in the Xe and/or Kr enriched purge stream 105.

This problem can be further addressed in an economically efficient manner while also permitting the Xe and/or Kr concentration of the Xe and/or Kr enriched purge stream 105 to be significantly improved by recycling (or dynamically recycling) a portion of the Xe and/or Kr enriched purge stream 105 to the compression system 101 so that this portion can undergo purification via the PPU 13 yet again to further remove $CO_2$ and $N_2O$. To help maximize Xe recovery while also maintaining or improving upon $CO_2$ and $N_2O$ removal, the PPU 13 can include small pore zeolites, such as 4A zeolites (also referred to as NaA zeolite), in at least one front-end adsorber of the PPU for $CO_2$ and $N_2O$ removal. The pore size of 4A zeolite can be large enough to allow $CO_2$ and $N_2O$ to adsorb therein, but small enough to exclude the majority of Xe in the fluid being adsorbed, which can allow for higher Xe recovery through the adsorber(s) of the PPU 13 and provide improved concentration of Xe in downstream processes of the plant 10 that are downstream of the PPU 13. This result can further enhance the improvement provided by the above discussed adjustable recycling operation of the second portion 108 of the Xe and/or Kr enriched purge stream.

The 4A zeolite can be used as a full or partial replacement of 13X zeolite in the PPU 13. In some embodiments, it may be most advantageous to size the 4A zeolite for $CO_2$ removal, and some $N_2O$ removal, while keeping some 13X zeolite for trace hydrocarbon removal and remaining $N_2O$ removal as adsorbent material in the PPU 13. In yet other embodiments, the adsorbent material may not have any 13X zeolite and may instead include 4A zeolite for reducing Xe losses even further (e.g. by up to a factor of 10). Other small pore zeolites may be used in addition to or as a substitute for 4A zeolite. These other small pore zeolites can include, for example, chabazite, rho, gismondine, or merlinoite, with varying extra-framework cation combinations within these zeolites. The A zeolite could include one or more of the following extra-framework cations: sodium (Na), potassium (K), calcium (Ca), and zinc (Zn) in some of these embodiments.

We determined that the recycling of a portion of the purge stream 105 or 105a as well as the dynamic adjustment of the fraction of this purge stream recycled to the PPU 13 as discussed herein can provide significant operational and plant design improvements in operation and capital costs. Moreover, recycling a portion of such a purge stream to the PPU after the Xe and/or Kr content of has been increased significantly e.g. a factor of over 100 or of about 500, etc.), it is unexpected to then have such a fluid having such an increase rare gas concentration recycled to then dilute the rare gas component(s) by mixing the recycled portion of the purge gas with compressed feed air or the feed air. This mixing of the recycled portion can result in the concentrations of the rare gas components being reduced back to a level that is close to their initial low concentrations within the feed air. This had been conventionally considered undesirable. However, implementation of such a design has been found to provide a surprising improvement in operational efficiency and plant design as discussed herein. Embodiments as discussed herein can provide a plant design and plant operational scheme that is contrary to standard practice and protocols in the art to provide a surprising improvement in operational efficiency that also permits a reduction in capital costs.

It should be appreciated that embodiments of the plant 10 can include an arrangement where there is a single DPU 21 that is fed by combined Xe and/or Kr enriched streams from one or more ASUs. In such embodiments or in other embodiments, that may utilize multiple ASUs, the plant 1 can utilize a recycling of a portion of the Xe and/or Kr enriched purge stream to a PPU of only one of the multiple ASUs or to different PPUs of different ASUs. In such embodiments, the recycling of the Xe and/or Kr enriched stream can be routed to only one of the PPUs of multiple different ASUs or there can be multiple recycle streams that are each recycled back to a respective PPU of the different ASUs of the plant 10.

Embodiments of the plant 10 can utilize a controller to monitor and control operations of the plant 10. For instance, embodiments of the plant 10 shown in FIGS. 1-2 as well as other embodiments explicitly discussed herein can include a controller such as the exemplary controller shown in FIG. 3. Temperature sensors, pressure sensors, flow sensors, and concentration sensors configured to detect a concentration of one or more compounds (e.g. $O_2$, Ar, $CO_2$, $N_2$, Xe, Kr, CO, $CH_4$, water, etc.) can be included for sensing and/or detecting flow rates, concentrations, temperatures or pressures of fluid flowing through different elements or units of the plant and/or conduits between those units. For example, there can be sensors positioned to detect (i) the air flow rate, pressure, temperature and feed concentrations for the air fed to the compression system 101, (ii) flow rate, pressure, temperature and/or feed concentrations of the air output from the compression system 101 for feeding to a heat exchanger (e.g. first HX 15), (iii) flow rate, pressure, temperature and feed concentrations of the air output from a heat exchanger for feeding to another plant unit, and/or (iv) the flow rate, pressure, temperature and constituent concentrations of the fluid output from a plant unit. There can also be other sensors positioned in the plant 10 to monitor and control the operations of these elements of the plant 10. A controller can be provided to receive data from these sensor and adjust operations of different elements based on the received sensor data. An example of such a controller can be seen in FIG. 3, and can include a processor connected to a non-transitory computer readable medium and at least one interface for communications with the sensors. The processor can run at least one automated control program stored in the computer readable medium (e.g. non-transitory memory, flash memory, etc.) that defines a method for controlling the operation of the plant and/or one or more elements of the plant.

It should be appreciated that embodiments of the controller can also be configured to utilize other sensor data to actuate different plant operations and use of different conduits for different flow paths of fluid to and from different elements. In some embodiments, the controller can be connected to a display, and at least one input device and/or input/output device to facilitate output of data to a user or operator and receipt of input from an operator. For instance, the controller can be connectable to an operator work station or a computer of an operator of the plant. The controller can also be connected to other plant control elements for incorporation into a larger automated process control system for the plant.

We have determined that embodiments of our plant 10, air separation process, and methods of making and using the same can be configured to provide an increase in xenon (Xe) and/or krypton (Kr) recovery while also permitting plant operations to be performed at a lower operational cost by reducing the amount of power or energy needed for operations due to an improvement that can be provided in purification of the Xe and/or Kr output from the first HX 15 or first separation system 17 for being fed to at least one DPU 21. Moreover, embodiments can provide enhanced operational flexibility to account for impurity breakthrough events that may arise during operation of the plant 10.

Embodiments of our improved Xe and/or Kr recovery process can also include kits that permit a pre-existing air separation plant or other type of air separation unit to be modified to perform Xe recovery and/or have an improved Xe recovery and/or Kr recovery. For instance, some embodiments can provide a kit for a plant operator to upgrade the plant 10 to include a flow splitting device 19 and/or a new configuration for a heat exchanger and/or PPU so that the plant can utilize an embodiment of our process for providing improved Xe and/or Kr recovery from the feed gas 100 and/or improved operational efficiency by increasing the Xe and/or Kr concentration in the stream fed to the DPU 21. The kit can include adjustment to the PPU adsorbent material and/or PPU 13, adjustment to conduits for a heat exchanger and/or providing DPU 21 process elements for purification of the Xe and/or Kr containing purge stream 105 for producing at least one product flow comprising Xe and/or Kr. The provided kit can permit an operator to recycle a portion of the Xe and/or Kr containing purge stream 105 so that the recycled portion can be increased as more $CO_2$ and/or $N_2O$ is detected as passing through the PPU 13 as well (e.g. include software upgrades for a controller or a new controller, etc.). Such kits can help plant operators adjust operation to provide new products due to inclusion of at least one DPU 21 or improve their yield and profit of a pre-existing Xe and/or Kr recovery operation.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. For instance, the size and configuration of any heat exchanger, adsorber, compressor, column, conduits, expanders, pumps, or compressors utilized in an embodiment can be modified to meet a particular set of design criteria. As another example, the flow rate, pressure, and temperature of the fluid passed through one or more heat exchangers as well as passed through other plant elements can vary to account for different plant design configurations and other design criteria. As yet another example, the number of plant units and how they are arranged can be adjusted to meet a particular set of design criteria. As yet another example, the material composition for the different structural components of the units of the plant and the plant can be any type of suitable materials as may be needed to meet a particular set of design criteria.

It should be appreciated that embodiments of the plant can be configured as an air separation plant or other type of plant in which it is desired to recover nitrogen and/or argon from a feed gas (e.g. air, waste emissions from a plant, etc.). The plant 10 can be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the processes utilized to recover fluids (e.g. oxygen, argon, and/or nitrogen as well as krypton and/or xenon) from air, gas separation plants configured to recover nitrogen, argon and/or oxygen from at least one feed gas, air separation plants, air separation systems, plants utilizing such systems or processes, and methods of making and using the same have been shown and described above, it is to be distinctly understood that the invention is not limited thereto but may be otherwise variously embodied and practiced within the scope of the following claims.

What is claimed is:

1. A process for separation of a feed gas comprising oxygen, nitrogen, and argon, the process comprising:
    purifying a compressed feed gas via a pre-purification unit (PPU) before feeding the purified and compressed feed gas to a first separation system to form at least one product flow from the feed gas, the at least one product flow including a nitrogen flow, an oxygen flow, and/or an argon flow;
    outputting a first purge stream comprising xenon (Xe) and/or krypton (Kr) from the first separation system; and
    splitting the first purge stream so that a first portion of the first purge stream is directed to at least one downstream processing unit (DPU) to form a first product flow comprising Xe and/or a second product flow comprising Kr and a second portion of the first purge stream is directed upstream of the PPU for undergoing additional purification via the PPU.

2. A process for separation of a feed gas comprising oxygen, nitrogen, and argon, the process comprising:
    purifying a compressed feed gas via a pre-purification unit (PPU) before feeding the purified and compressed feed gas to a first separation system to form at least one product flow from the feed gas, the at least one product flow including a nitrogen flow, an oxygen flow, and/or an argon flow;
    outputting a first purge stream comprising xenon (Xe) and/or krypton (Kr) from the first separation system;
    splitting the first purge stream so that a first portion of the first purge stream is directed to at least one downstream processing unit (DPU) to form a first product flow comprising Xe and/or a second product flow comprising Kr and a second portion of the first purge stream is directed upstream of the PPU for undergoing additional purification via the PPU; and
    adjusting the splitting of the first purge stream so that a flow rate of the first portion of the first purge stream directed to the at least one DPU is decreased and a flow rate of the second portion of the first purge stream directed to the PPU is increased so that a fraction of the first purge stream that is recycled to the PPU is increased in response to a concentration of carbon dioxide ($CO_2$) and/or nitrous oxide ($N_2O$) meeting or exceeding a first pre-selected threshold value.

3. The process of claim 1, comprising:
    adjusting the splitting of the first purge stream so that a fraction of the first purge stream that is recycled to the PPU is increased in response to a concentration of carbon dioxide ($CO_2$) and/or nitrous oxide ($N_2O$) in the purified and compressed feed gas meeting or exceeding a first pre-selected threshold value.

4. The process of claim 3, wherein the PPU includes adsorbent material comprising zeolites having a pore size that is sized to receive and adsorb $CO_2$ and $N_2O$ herein while excluding a majority of the Xe in the compressed feed gas undergoing purification within the PPU.

5. The process of claim 4, wherein the adsorbent material include 4A zeolite, chabazite, rho, gismondine, and/or merlinoite.

6. The process of claim 1, wherein the splitting of the first purge stream so that the first portion of the first purge stream is directed to the at least one downstream processing unit (DPU) to form the first product flow comprising Xe and/or the second product flow comprising Kr and the second portion of the first purge stream is directed upstream of the PPU for undergoing the additional purification via the PPU is performed via a valve or a splitting device.

7. The process of claim 6, wherein the valve or the splitting device is positioned external to a coldbox.

8. The process of claim 1, wherein the splitting of the first purge stream so that the first portion of the first purge stream is directed to the at least one downstream processing unit (DPU) to form the first product flow comprising Xe and/or the second product flow comprising Kr and the second portion of the first purge stream is directed upstream of the PPU for undergoing the additional purification via the PPU is performed via a first heat exchanger that is downstream of the PPU and upstream of the first separation system.

9. The process of claim 8, wherein the first heat exchanger is a first heat exchanger of a coldbox.

10. The process of claim 1, wherein the splitting of the first purge stream so that the first portion of the first purge stream is directed to the at least one downstream processing unit (DPU) to form the first product flow comprising Xe and/or the second product flow comprising Kr and the second portion of the first purge stream is directed upstream of the PPU for undergoing the additional purification via the PPU is performed external to a coldbox or in the coldbox.

11. The process of claim 2, wherein the PPU includes adsorbent material comprising zeolites having a pore size that is sized to receive and adsorb $CO_2$ and $N_2O$ herein while excluding a majority of the Xe in the compressed feed gas undergoing purification within the PPU.

12. The process of claim 11, wherein the adsorbent material include 4A zeolite, chabazite, rho, gismondine, and/or merlinoite.

13. The process of claim 2, wherein the splitting of the first purge stream so that the first portion of the first purge stream is directed to the at least one DPU to form the first product flow comprising Xe and/or the second product flow comprising Kr and the second portion of the first purge stream is directed upstream of the PPU for undergoing the additional purification via the PPU is performed via a valve or a splitting device.

14. The process of claim 13, wherein the valve or the splitting device is positioned external to a coldbox.

15. The process of claim 2, wherein the splitting of the first purge stream so that the first portion of the first purge stream is directed to the at least one DPU to form the first product flow comprising Xe and/or the second product flow comprising Kr and the second portion of the first purge stream is directed upstream of the PPU for undergoing the additional purification via the PPU is performed via a first heat exchanger that is downstream of the PPU and upstream of the first separation system.

16. The process of claim 15, wherein the first heat exchanger is a first heat exchanger of a coldbox.

17. The process of claim 2, wherein the splitting of the first purge stream so that the first portion of the first purge stream is directed to the at least one downstream processing unit (DPU) to form the first product flow comprising Xe and/or the second product flow comprising Kr and the second portion of the first purge stream is directed upstream of the PPU for undergoing the additional purification via the PPU is performed external to a coldbox or in the coldbox.

* * * * *